United States Patent
Sasaki et al.

(10) Patent No.: US 7,435,482 B2
(45) Date of Patent: Oct. 14, 2008

(54) ARTICLE OR TRANSPARENT COMPONENT HAVING LIQUID REPELLENT LAYER, OPTICAL LENS HAVING LIQUID REPELLENT LAYER AND PRODUCTION PROCESS THEREOF, AND PROJECTION TYPE DISPLAY APPARATUS USING THE LENS

(75) Inventors: Hiroshi Sasaki, Mito (JP); Kazuo Shikita, Yokohama (JP); Satoshi Nakayama, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 11/193,945

(22) Filed: Jul. 27, 2005

(65) Prior Publication Data
US 2006/0166006 A1   Jul. 27, 2006

(30) Foreign Application Priority Data
Jan. 21, 2005   (JP) .............................. 2005-013970

(51) Int. Cl.
*B32B 17/06* (2006.01)
*B32B 18/00* (2006.01)
*B32B 33/00* (2006.01)
*G02B 3/00* (2006.01)

(52) U.S. Cl. ................ 428/432; 428/447; 428/689; 428/702; 359/649

(58) Field of Classification Search ................ None
See application file for complete search history.

(56) References Cited

U.S. PATENT DOCUMENTS

| | | | | | |
|---|---|---|---|---|---|
| 5,922,787 | A | * | 7/1999 | Kondo et al. | 523/122 |
| 6,066,401 | A | * | 5/2000 | Stilburn | 428/432 |
| 6,325,514 | B1 | * | 12/2001 | Yamamoto | 353/31 |
| 6,833,159 | B1 | * | 12/2004 | Boulineau et al. | 427/167 |
| 2004/0142185 | A1 | | 7/2004 | Takushima | |

FOREIGN PATENT DOCUMENTS

| | | |
|---|---|---|
| JP | 09-255919 | 9/1997 |
| JP | 11-258405 | 9/1999 |
| JP | 11-311168 | 11/1999 |

OTHER PUBLICATIONS

U.S. Appl. No. 11/038,116, filed Jan. 21, 2005.

\* cited by examiner

*Primary Examiner*—Ramsey Zacharia
(74) *Attorney, Agent, or Firm*—Hogan & Hartson LLP

(57) ABSTRACT

It is an object to form a highly wear-resistant liquid repellent layer on a non-oxide surface. The oxide layer 8 is formed on the non-oxide material 1 surface. The oxide layer 8 is bound to the liquid repellent layer 3, made of a compound having a perfluoropolyether or perfluoroalkyl chain, at the binding sites 2.

8 Claims, 3 Drawing Sheets

OXYGEN PLASMA, OZONE, UV OR THE LIKE

REACTION WITH A LIQUID REPELLENT AGENT

ARTICLE OR TRANSPARENT COMPONENT HAVING LIQUID REPELLENT LAYER, OPTICAL LENS HAVING LIQUID REPELLENT LAYER AND PRODUCTION PROCESS THEREOF, AND PROJECTION TYPE DISPLAY APPARATUS USING THE LENS

FIELD OF THE INVENTION

The present invention relates to an article or transparent component having liquid repellent layer, in particular an optical lens for optical devices and projection type display apparatus using the lens.

BACKGROUND OF THE INVENTION

An optical lens (hereinafter referred simply to lens) for various optical apparatuses, e.g., projection type display apparatus, sometimes referred to LCD projector (so-called a rear or front projector, hereinafter referred simply to a projector), digital camera, video camera, CCD camera and optical microscope, comprises a base made of a highly transparent material, e.g., glass or acrylic resin.

A lens is coated with an anti-reflective membrane, when used for a display apparatus, e.g., LCD projector, where light reflected from the lens significantly affects image formation, in order to prevent adverse effect by reflected light on the optical system in the apparatus. The common anti-reflective membrane has a mono- or multi-layered structure.

A mono-layered anti-reflective membrane is made of magnesium fluoride in most situations. It has a refractive index of 1.38, which is considerably lower than that of glass (refractive index: 1.5 to 1.54) or acrylic resin (refractive index: 1.49). Thickness of an anti-reflective membrane is determined by dividing light wavelength in a range from 540 to 550 nm, which is considered to be that of the visible light which human eyes perceive most sensitively, by four times of refractive index of the membrane material. More specifically, the thickness is set at around 100 nm as a target, when magnesium fluoride is used.

For a multi-layered membrane, two to five layers are laminated to decrease refractive index. For example, a three-layered anti-reflective membrane to be formed on glass (refractive index: 1.52, for example) may comprise 3 materials of different refractive index, slightly higher, considerably higher and considerably lower than that of glass, in this order from the glass. One example of this structure comprises cesium fluoride (refractive index: 1.63), zirconium oxide (refractive index: 2.10) and magnesium fluoride (refractive index: 1.38), in this order from the glass. A multi-layered membrane has a more accurately controlled thickness, because it is produced by a vacuum process, e.g., sputtering or deposition. Magnesium fluoride is a normal choice for the outermost layer, because it is considerably lower in refractive index than glass and highly transparent, and can be formed into a membrane by vacuum deposition.

By the way, magnesium fluoride involves problems of being stained with dirt and dust in air (e.g., tar, soot and the like) to lose its light transmittance. Some of the major causes for greatly decreasing lens transmittance include oil mist in beef barbecue restaurants, and tar and smoke in confined spaces, which darken or blur displayed images. It is difficult for an inexpert to clean a stained optical system in an apparatus, especially in projector. Therefore, an optical system with a stained lens may have to be replaced totally at worst.

One of the methods proposed to protect the lens surface from staining is coating the surface with a fluorine-based resin, known for its high liquid repellency, to decrease surface energy. A coating membrane of fluorine-based resin has a higher contact angle with water than a magnesium fluoride membrane, around 100 to 110° versus 40 to 50°, and has a higher effect of preventing surface staining. However, a fluorine-based resin has a high electrical resistance. For example, fluorine-based resins, beginning with polytetrafluoroethylene, have a much higher surface resistance than glass, as high as $10^{16}$ to $10^{18}\Omega$ versus $10^{17}$ to $10^{12}\Omega$. Therefore, they tend to be charged with built-up static electricity, causing problems of statically attracting dust or the like, which is more noted in low humidity conditions in winter.

An anti-reflective membrane may lose its anti-reflective function, when coated with an excessively thick membrane. A mono-layered anti-reflective membrane, for example, is designed to have a thickness of $\lambda/4n$, where $\lambda$: wavelength of the visible light which human eyes perceive most sensitively, and n: refractive index of the membrane material. A membrane having a thickness deviating from the above level will have a deteriorated effect of decreasing reflectivity. For example, an anti-reflective membrane of magnesium fluoride, which has a refractive index of 1.38, is produced to have a target thickness of 94 to 100 nm. Coating the anti-reflective membrane with a liquid repellent layer, e.g., of silicon-based material having a higher refractive index than magnesium fluoride, increases its reflectivity, even when the layer has a thickness of 10 nm or so. More specifically, coating the anti-reflective membrane with a liquid repellent layer of silicon-based material having a refractive index of 1.45 to an average thickness of 10 nm increases its reflectivity at a wavelength of 550 nm to around 3% from 0.8% as that of the uncoated one.

Moreover, the anti-reflective membrane will have a deteriorated anti-reflective function, even when coated with a fluorine-based resin having a lower refractive index (e.g., 1.34) than magnesium fluoride to a certain thickness. The inventors of the present invention have found that the anti-reflective membrane tends to have an increased reflectivity, when coated with the resin to a thickness of above 20 nm, although keeps its reflectivity essentially unchanged irrespective of thickness of the coating membrane so long as it is 20 nm or less. It is therefore necessary to keep the coating membrane 20 nm thick or less, and uniformly thick. However, the coating membrane of a fluorine-based resin is formed by spreading the coating solution, not by vacuum evaporation or sputtering. Spreading the solution to have a membrane whose thickness is controlled at 20 nm or less over the entire lens surface is difficult for a mass production process, or needs an unrealistic system or process to achieve the well-controlled membrane thickness.

As discussed above, it is not easy to coat an anti-reflective membrane of magnesium fluoride with a liquid repellent layer without increasing reflectivity and electrical resistance (i.e., without increasing static electrification) of the anti-reflective membrane.

For forming a liquid repellent layer, Patent Document 1 discloses a method for preventing deposition of stain on a CRT surface by coating the surface with a mist-proof membrane of liquid repellent agent with a perfluoropolyether chain responsible for liquid repellency and alkoxysilane residue at the molecule terminal as a group via which the membrane is bound to another material. Patent Document 2 discloses a technique to improve combustion characteristics of an engine burning fuel directly injected into the cylinder, where the fuel injection valve is treated to be liquid repellent around the nozzle. Desired combustion characteristics may not be secured when deposit produced by the combustion in the cylinder sticks to the valve around the nozzle, because of changed quantity of the fuel injected and fuel injection angle. The technique is intended to prevent the deposit from sticking to the valve, and thereby to control injected fuel quantity and injection angle changes by providing a liquid repellent layer around the nozzle.

Patent Document 1: JP-A-9-255919
Patent Document 2: JP-A-11-311168

BRIEF SUMMARY OF THE INVENTION

Recently, liquid repellent agents which can form a monomolecular liquid repellent layer have been developed. Such a layer can have a thickness controlled at several nanometers to several tens nanometers while keeping its electrical resistance not increased. These agents have a perfluoropolyether or perfluoroalkyl chain responsible for liquid repellency and alkoxysilane or chlorosilane residue at molecule terminal as a group via which the layer is bound to another material. More specifically, the alkoxysilane or chlorosilane residue is chemically bound to an oxide layer (including hydroxyl or carboxyl group, or the like) on a glass or metal surface. In other words, it forms the oxygen-silicon bond on the surface to work as a liquid repellent agent for forming a monomolecular layer.

FIG. 1 schematically illustrates a liquid repellent layer formed by the aid of a liquid repellent agent. As shown, the liquid repellent layer 3 formed by the agent is chemically bound to the base 1 having the oxide layer 8 thereon via the binding sites 2. This provides the liquid repellent layer of high wear resistance. The monomolecular layer is bound to the surface partly rather than covering it totally, with the result that the treated surface shows essentially no increase in electrical resistance. Moreover, it is thin at several to several tens nanometers, causing essentially no optical problems, e.g., interference or decreased transmittance with the visible light. Therefore, some attempts have been made to provide a liquid repellent layer on glass and metal surfaces.

Use of such an agent is essentially limited to treatment of glass and metal surfaces, because the surface to be treated to have a monomolecular layer should have an oxide layer thereon. Therefore, the agent cannot form a liquid repellent layer, e.g., that shown in FIG. 1, on a magnesium fluoride surface, because the surface lacks an oxide layer working as an underlayer to which the agent is chemically bound. It is actually observed that the treated magnesium fluoride surface greatly loses its liquid repellent capacity, even when rubbed with cloth lightly, conceivably because the agent, which is not chemically bound to the surface, is rubbed away by cloth. The similar wear resistance test confirms that a glass or metal surface coated with a chemically bound liquid repellent layer shows little deterioration of liquid repellent capacity.

An optical part, e.g., lens, will be stained with oil when touched with a bare hand, however it is provided with liquid repellent capacity. It can be often rubbed daily with cloth to clean the surface. A lens, in particular, will lose light transmittance when stained with oil, to cause problems of displaying darkened images. Therefore, it is required to have sufficient wear resistance not to lose liquid repellent capacity of the liquid repellent layer, even when rubbed with cloth very often.

It is therefore very difficult to form a monomolecular liquid repellent layer chemically bound to a magnesium fluoride surface, in order to solve the above problems or satisfy the above requirements, by use of a liquid repellent agent having, in the molecular structure, a perfluoropolyether or perfluoroalkyl chain responsible for liquid repellency and alkoxysilane or chlorosilane residue at molecule terminal as a group via which the layer is chemically bound to another material.

Similarly, polypropylene, acrylic resin, polycarbonate resin and the like, also lacking a surface oxide layer, cannot be provided with a chemically bound liquid repellent layer of high wear resistance using the above-described agent.

It is an object of the present invention to provide a material which is not originally an oxide (hereinafter referred to as non-oxide material) comprising with a liquid repellent layer of high wear resistance formed on a surface thereof. It is another object to provide various opaque or transparent articles, components and apparatuses, including various types of livingware (beginning with consumable goods and durable fixtures), ornaments, infrastructures and so on.

Inventors of the present invention have found, after having extensively studied various liquid repellent materials, that a liquid repellent layer of high wear resistance can be formed on a surface, when a very thin oxide layer is provided between the layer and surface, achieving the present invention. Taking a lens as an example, a liquid repellent layer of high wear resistance can be formed on a surface layer of magnesium fluoride, after it is converted into magnesium oxide. The oxide layer may be formed by irradiating magnesium fluoride with oxygen plasma, UV or ozone.

Some of the means for achieving the above object are described below.

(1) For an article of non-oxide material, a liquid repellent layer is formed on the surface via an oxide layer, where the liquid repellent layer is made of a compound having a perfluoropolyether or perfluoroalkyl chain.

(2) For a transparent, optical component of non-oxide material, a liquid repellent layer is formed on the surface via an oxide layer, where the liquid repellent layer is made of a compound having a perfluoropolyether or perfluoroalkyl chain.

(3) For a lens of glass or transparent resin as a base material, the lens comprises an anti-reflective membrane on a surface thereof with magnesium fluoride used for the outermost layer, where a surface of the magnesium fluoride layer has a magnesium oxide layer and liquid repellent layer of a compound having a perfluoropolyether or perfluoroalkyl chain.

(4) The above-described lens with a liquid repellent layer of a compound having a perfluoropolyether chain whose average molecular weight is 2000 or more.

(5) The above-described lens with a liquid repellent layer of a compound having a linear perfluoropolyether chain whose average molecular weight is 2000 or more.

(6) The above-described lens with a liquid repellent layer of a compound having the following structure:

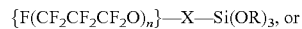

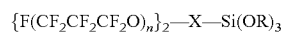

wherein, X is a site at which the perfluoropolyether chain is cross-linked to the anti-reflective membrane and linked with an alkoxysilane residue, and R is an alkyl group.

(7) A process for producing an optical lens comprising a glass or a transparent resin as a base material and an anti-reflective membrane on a surface of the base material, wherein magnesium fluoride is used for an outermost layer of the anti-reflective membrane and a liquid repellent layer is formed on a surface of the magnesium fluoride via a magnesium oxide layer, comprising the steps of:

forming the liquid repellent layer of a compound having a perfluoropolyether or perfluoroalkyl chain; and irradiating a surface of the lens with oxygen plasma irradiation, UV irradiation or ozone exposition before the liquid repellent layer is formed.

(8) A projection type display apparatus equipped with a light source, an optical integrator having a plurality of optical lenses, a display device, a projection optical system, a screen and a reflector, wherein a beam of light from the light source being reflected by the reflector is divided into a plurality of beams of light by the optical integrator to be directed towards the display device and the beams of light modulated by the display device are projected by the projection optical system onto the screen, wherein the optical lens is made of a glass or a transparent resin as a base material, and has an anti-reflective membrane on a surface thereof, the anti-reflective membrane comprises magnesium fluoride for an outermost layer and a magnesium oxide layer and a liquid repellent layer are formed on a surface of the magnesium fluoride, and the liquid repellent layer is made of a compound having a perfluoropolyether or perfluoroalkyl structure.

(9) The liquid repellent layer for the above-described projection type display apparatus is made of a compound having a perfluoropolyether chain whose average molecular weight is 2000 or more.

(10) The liquid repellent layer for the above-described projection type display apparatus is made of a compound having a linear perfluoropolyether chain whose average molecular weight is 2000 or more.

(11) The liquid repellent layer for the above-described projection type display apparatus is made of a compound having the following structure:

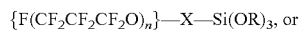

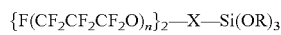

wherein, X is a site at which the perfluoropolyether chain is cross-linked to the anti-reflective membrane and linked with an alkoxysilane residue, and R is an alkyl group.

Other objects, features and advantages of the invention will become apparent from the following description of the embodiments of the invention taken in conjunction with the accompanying drawings.

DESCRIPTION OF REFERENCE NUMERALS

Figure 1:
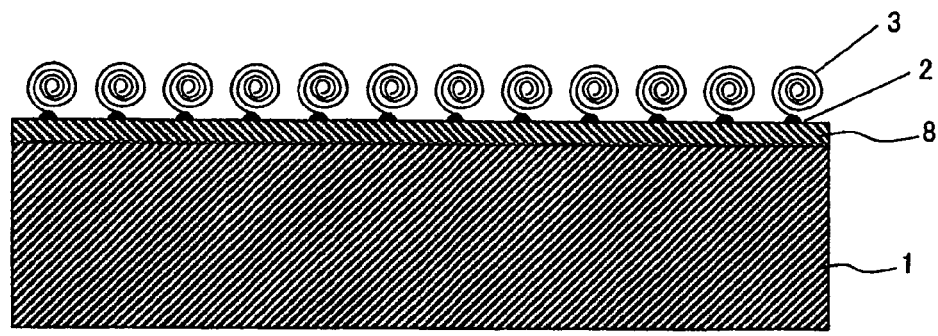
FIG. 1 is a sectional view of the liquid repellent layer made of a liquid repellent agent for forming monomolecular layers.

1: Base material coated with an oxide layer, 2: Binding site, 3: Liquid repellent layer, 4: Lens base material, 5: Cesium fluoride layer, 6: Zirconium oxide layer, 7: Magnesium fluoride layer, 8: Magnesium oxide layer, 9: Test specimen, 10: Eight sheets of gauze, specified by Japanese Pharmacopoeia, laid one on top of another, 11: Sliding material for wear resistance test, 12: Lens subjected to a liquid repellent layer treatment, 13: Mount for a reciprocating friction tester, 14: Hollow cylinder, 15: Lens, 16: Fan, 17: Lit cigarette, 18: Ash tray, 19: Light source, 20: Reflector, 21: Concave lens, 22: First lens array, 23: Second lens array, 24: Polarization converter, 25: Display device 2R, 26: Display device 2G, 27: Display device 2B, 28: Condenser lens, 29: Condenser lens 10R, 30: Condenser lens 10G, 31: Condenser lens 10B, 32: First relay lens, 33: Second relay lens, 34 to 37: Mirror, 38, 39: Dichroic mirror, 40: Dichroic-cross-prism, 41: Projection lens, 42: Screen

DETAILED DESCRIPTION OF THE INVENTION

The preferred embodiments of the present invention are described in detail by referring to the drawings for Examples, which by no means limit the present invention, and variations may be made without departing from the spirit and scope of the present invention.

Figure 2:
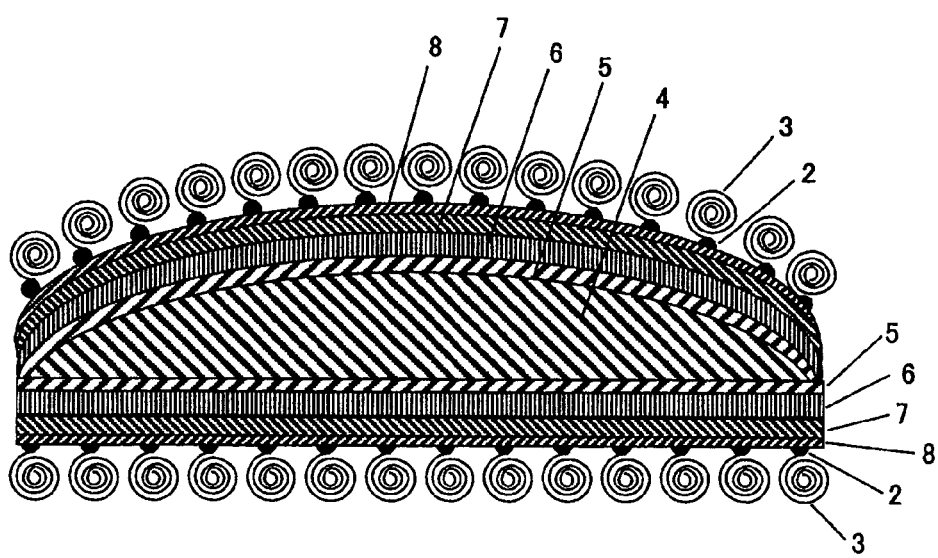
FIG. 2 is a sectional view schematically illustrating the lens of the present invention, coated with a liquid repellent layer.

FIG. 2 schematically illustrates one embodiment of the present invention, applied to an optical lens coated with a liquid repellent layer, which serves as the outermost layer for the lens. The anti-reflective membrane shown in the figure is of three-layered structure. However, number of the layers is not limited to three, so long as the outermost layer is made of magnesium fluoride.

Referring to FIG. 2, the lens base material 4 (normally glass or a transparent resin, e.g., acrylic resin) is coated with an anti-reflective membrane having a three-layered structure, with cesium fluoride layer 5, zirconium oxide layer 6 and magnesium fluoride layer 7, in this order from the base material 4. Moreover, the layer 7 is coated with the layer 8 (oxide layer) of magnesium oxide, which is prepared by oxidizing magnesium fluoride. The oxide layer (magnesium oxide layer 8) is coated with the liquid repellent layer 3 via the binding sites 2. The lens shown in FIG. 2 seems to be coated with the anti-reflective membrane on both sides, but may be coated on one side only.

The liquid repellent agent for forming the liquid repellent layer has a perfluoropolyether or perfluoroalkyl chain and residue at molecule terminal as a group via which the layer is bound to the anti-reflective membrane surface, as described above. The residue may be of alkoxysilane or chlorosilane. More specifically, it may have one of the structures, described below.

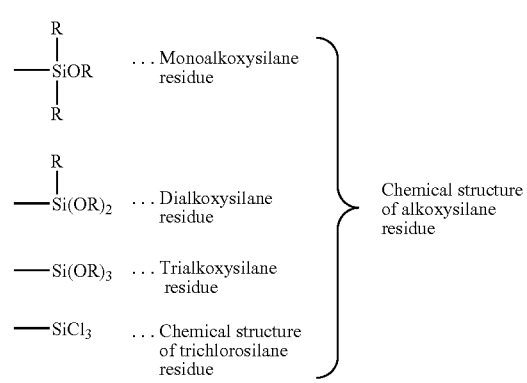

The alkoxy group in the alkoxysilane residue may be methoxy, ethoxy, propoxy or butoxy group, or the like. The alkoxysilane residue may be trialkoxysilane, monoalkyl-dialkoxysilane or dialkyl-monoalkoxysilane residue, or the like. The liquid repellent agent having the above residue is used for forming the liquid repellent layer on the lens of the present invention by the procedure shown in FIG. 3.

Figure 3:
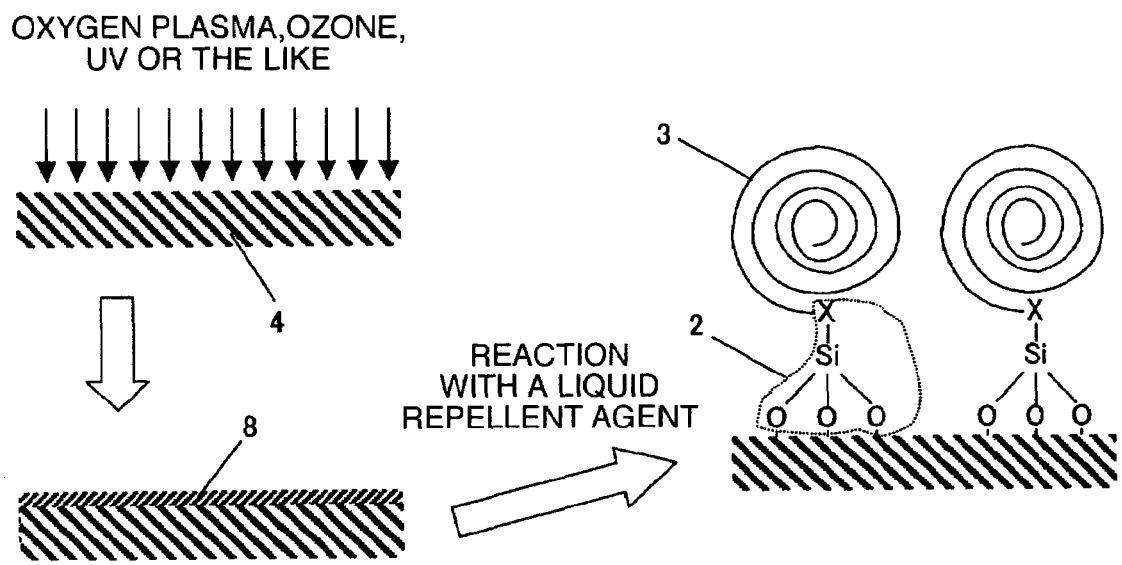
FIG. 3 schematically illustrates the process of the present invention for coating a lens with a liquid repellent layer.

FIG. 3 schematically illustrates the process for coating a lens with a liquid repellent layer. The present invention irradiates the lens base 4 with plasma, UV or ozone to transform the surface into the magnesium oxide layer 8, with which the oxysilane or chlorosilane residue X reacts to form the oxygen-silicon bond. The residue X in the liquid repellent agent molecular structure constituting the liquid repellent layer 3 serves as the binding site, at which the liquid repellent layer 3 and magnesium oxide layer 8 are chemically bound to each other through the oxygen-silicon bond. This cross-links the anti-reflective membrane to the liquid repellent agent molecules. An excessive quantity of the liquid repellent agent remaining unreacted is washed away to complete the intended film-making step.

Next, the specific structures, characteristics and the like of the alkoxysilane and chlorosilane residues are described. The chlorosilane residues include trichlorosilane, monoalkyl-dichlorosilane and dialkyl-monochlorosilane residues.

The alkoxysilane and chlorosilane residues are similar in that both form the chemical bond of oxygen-silicon, but different in the eliminated compound, alcohol and hydrochloric acid, respectively. Therefore, the former is more preferable, because it is free from troubles caused by hydrochloric acid, e.g., corrosion.

The alkoxysilane residues may be represented by trialkoxysilane, monoalkyl-dialkoxysilane and dialkyl-monoalkoxysilane residues. The compound having more chemical binding sites for one liquid repellent agent molecule can give the device of higher resistance to physical force, e.g., friction. Therefore, a trialkoxysilane residue is particularly more preferable than the others.

The alkoxy group in the alkoxysilane residue may be methoxy, ethoxy, propoxy or butoxy group, or the like. The group having a larger methylene number tends to have lower reactivity, more noted as it increases from 3 (i.e., propoxy group). Therefore, methoxy and ethoxy groups are more preferable in consideration of reactivity, i.e., capacity of forming the chemical bond. It should be noted, however, that methoxy group is highly reactive, and preferably stored at low temperature and humidity conditions to prevent its decomposition.

A perfluoropolyether or perfluoroalkyl chain in the liquid repellent agent is responsible for liquid repellency of the agent. Their structures are described below.

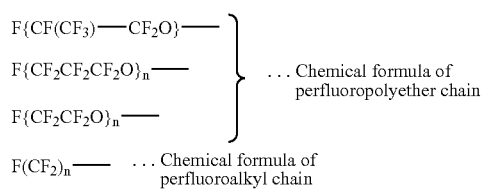

Comparing these two chain types, the liquid repellent layer of a compound having a perfluoropolyether chain tends to have higher liquid repellency. Moreover, the chain having an average molecular weight of 2,000 or more gives the liquid repellent layer of higher liquid repellency and wear resistance.

Still more, a linear perfluoropolyether chain tends to give the liquid repellent layer of higher liquid repellency and wear resistance than a branched one. In particular, the compounds of the following structure are preferable for high wear resistance of the liquid repellent layer which it gives.

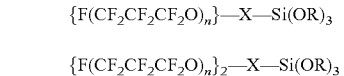

wherein, X is a site at which the perfluoropolyether chain is cross-linked to the alkoxysilane residue, and R is an alkyl group.

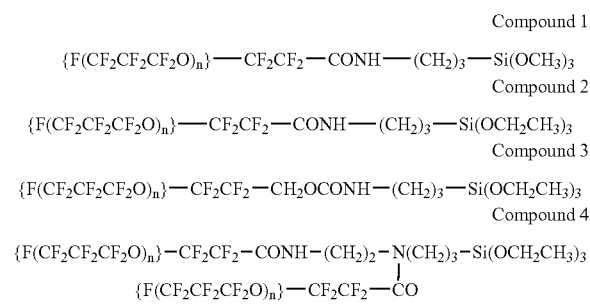

Compounds 1 to 4 have a linear perfluoropolyether chain having an average molecular weight of 2,000 or more. Moreover, they have a trialkoxysilane residue as the alkoxysilane residue at the terminal, trimethoxy residue (Compound 1) or triethoxy residue (Compounds 2 to 4). Compounds 1, 2 and 4 have the amide bond at the cross-linked site, whereas Compound 3 has the urethane bond. Compounds 1, 2 and 4 have one perfluoropolyether chain in the molecular structure, whereas Compound 3 has two. Methods for synthesizing these compounds are described below.

(Synthesis of Compound 1)

First, 40 parts by mass of Demnum SH (Daikin Kogyo, average molecular weight of the perfluoropolyether chain: 4,080) was dissolved in 200 parts by mass of Fluorinert PF-5080 (3M), to which 20 parts by mass of thionyl chloride was added. The mixture was stirred for 48 hours under reflux. This produced 40 parts by mass of the acid chloride of Demnum SH, after thionyl chloride and Fluorinert PF-5080 were removed by an evaporator. Then, the acid chloride was incorporated with 200 parts by mass of Fluorinert PF-5080 and cooled to 0° C., to which 2 parts by mass of Sila-Ace S360 (Chisso) and 30 parts by mass of triethylamine were added. The mixture was stirred for 2 hours at 0° C. and then for 20 hours at room temperature. The resultant reaction solution was filtered by RADIOLITE FINE FLOW A (Showa Chemical Industry), and Fluorinert PF-5080 in the filtrate was removed by an evaporator, to produce Compound 1 (36 parts by mass).

(Synthesis of Compound 2)

Compound 2 (36 parts by mass) was produced in the same manner as that for Compound 1, except that 2 parts by mass of Sila-Ace S360 (Chisso) was replaced by 3 parts by mass of Sila-Ace S330.

(Synthesis of Compound 3)

First, 42 parts by mass of Demnum SA (Daikin Kogyo, average molecular weight of the perfluoropolyether chain: 4,200) was dissolved in 200 parts by mass of Fluorinert PF-5080 (3M), to which 0.01 parts by mass of dibutyl tin (IV)

dilaurate was added. The mixture was cooled to 0° C., to which 3 parts by mass of a silane coupling agent (KBE9007, Shin-Etsu Chemical) was added dropwise. The mixture was stirred for 2 hours at 0° C. and then for 20 hours at room temperature. The resultant reaction solution was filtered by RADIOLITE FINE FLOW A (Showa Chemical Industry), and Fluorinert PF-5080 in the filtrate was removed by an evaporator, to produce Compound 3 (33 parts by mass).

(Synthesis of Compound 4)

Compound 4 (33 parts by mass) was produced in the same manner as that for Compound 1, except that 2 parts by mass of Sila-Ace S360 (Chisso) was replaced by 1.5 parts by mass of Sila-Ace S320. Compounds 1 to 4 synthesized above were identified by confirming formation of the cross-linked site (amide bond for compounds 1, 2 and 4, and urethane bond for Compound 3) by infrared spectroscopy. Whether or not the amide or urethane bond is formed can be determined by stretching vibration due to carbonyl group (C=O) in the bond. Synthesis of Compounds 5 to 12, described later, was confirmed in a similar manner. Average molecular weight of the perfluoropolyether chain was determined by the integrated value of the $^{19}$F-NMR spectral pattern.

Next, the process for producing the liquid repellent layer is described. The liquid repellent layer for the embodiment comprises steps for substrate pretreatment, coating and heating. These steps are described in detail.

(a) Pretreatment

The pretreatment step is carried out for surface modification to improve lens cleaning, substrate wettability and the like. This is to uniformly coat the lens with magnesium fluoride.

(a-1) Lens Cleaning

A lens is cleaned with a solvent, detergent or the like which can efficiently dissolve or remove stain sticking to the lens. For a lens of resin, e.g., acrylic resin or polycarbonate, an alcohol-based solvent, e.g., methanol, ethanol, propanol or butanol, is more preferable than tetrahydrofuran or dioxane which can dissolve the lens surface to cause fogging. For a lens of glass, a slight degree of surface etching can also remove stain by immersing the lens in a weakly alkaline solution (e.g., aqueous solution of sodium carbonate). However, care shall be taken not immerse a lens for an excessive time, or the surface may be excessively etched to lose magnesium fluoride responsible for its anti-reflective function.

(a-2) Surface Modification

The surface modification is carried out to improve lens surface wettability, and also to form the reaction sites at which a liquid repellent agent is chemically bound to magnesium fluoride. Improving lens surface wettability allows a coating solution in which a liquid repellent agent is dissolved or suspended (hereinafter referred to as liquid repellent agent solution) to be spread more uniformly, bringing advantages, e.g., reduced layer thickness variations to improve optical characteristics of the lens. A lens base can be surface-modified to have improved wettability by various methods, e.g., irradiation with plasma, ozone or UV, or chemical treatment with an acid or alkaline solution. Moreover, these methods oxidize the magnesium fluoride surface, although very slightly, to form hydroxyl group on the surface. Hydroxyl group works as a reaction site at which magnesium fluoride is bound to a liquid repellent agent in the subsequent step. Therefore, the surface modification in the pretreatment step is important also from this standpoint.

Surface Modification by Irradiation

The surface modification falling into this category includes irradiation with oxygen plasma, ozone, UV or the like. In each method, active oxygen acts on the base surface to form hydroxyl or carboxyl group. The hydroxyl group subsequently serves as a reaction site to form the chemical bond with a liquid repellent agent. Hydroxyl or carboxyl group is hydrophilic to improve wettability of the surface on which it is formed. Therefore, the surface is wettable with a liquid repellent agent solution to facilitate formation of the layer of uniform thickness. UV transforms oxygen in air into the active state to modify the surface, i.e., to form hydroxyl or carboxyl group on the surface. Therefore, it brings an effect similar to that by oxygen plasma or ozone. For plasma irradiation, the reactive ion etching (normal RIE) mode, in which the plasma is accelerated by an ion sheath, performs the pretreatment more efficiently in a shorter time than the normal direct plasma (normal DP) mode, and more advantageous accordingly.

Chemical Modification

Magnesium fluoride on the lens surface, when immersed in an aqueous alkaline solution, has the magnesium-fluorine bond on the surface broken to form hydroxyl group, which serves as a reaction site to form the chemical bond with a liquid repellent agent and, at the same time, improves wettability of the surface with the liquid repellent agent.

(a-3) Coating Step

Next, preparation of a liquid repellent agent solution and coating procedure are described. Preparation of liquid repellent agent solution First, the liquid repellent is diluted to an adequate concentration. A solvent as the diluent is preferably well dissolving the liquid repellent agent, and low in moisture content to protect an alkoxysilane or chlorosilane residue, which is amenable to hydrolysis. It also preferably evaporates quickly on completion of the treatment, to reduce pretreatment time. In consideration of the above conditions, the solvent is preferably selected from those which scarcely dissolve water, e.g., fluorine-based ones. More specifically, the fluorine-based solvents useful for the present invention include Fluorinert FC-72, FC-77, PF-5060, PF-5080, HFE-7100 and HFE-7200 (3M), and Vertrel XF (Du Pont). Concentration of the solution is generally around 0.1 to 1.0% by mass, although varying depending on coating procedure.

Coating Method

The coating method for the present invention is not limited, and the lens may be coated by spin coating, dip coating, bar coating, coating by an applicator, spray coating, flow coating or the like. It is necessary to control coating solution concentration and coating conditions of a method adopted at adequate levels, in order to secure the layer of adequate thickness. Thickness of the layer, which is monomolecular, considerably depends on molecular chain length, when a liquid repellent agent sufficiently remains on the surface. The length tends to increase as the molecular weight of the agent at the liquid repellent site increases. The layer having a thickness, which depends on molecular weight of the agent at the liquid repellent site, can be produced by coating the surface with a liquid repellent agent in a quantity slightly larger than the target level and then removing the surplus agent when the heating step is completed.

Thickness of the layer is limited to a certain level, more specifically length of the molecular chain at the liquid repellent site, although depending on average molecular weight of the liquid repellent adopted and density of the monomolecular layer on the lens surface. The inventors of the present invention have experimentally confirmed that the thickness is limited to around 3 nm when the liquid repellent molecule has an average molecular weight of around 2,000 at the liquid repellent site, and to around 10 nm when it is around 8,000. They also have found that the thickness grows slowly as the average molecular weight increases beyond around 12,000. The thickness remains unchanged at 19 nm when the average molecular weight increases from around 16,000 to 20,000.

Heating

The coated lens is heated to remove the solvent by evaporation, or to chemically bind the alkoxysilane or chlorosilane residue to the surface. The heating conditions are around 120 to 150° C. and 10 to 30 minutes, although varying depending on the compound to be heated.

Post-treatment

The above heating step chemically binds the liquid repellent agent to the coated lens surface. The as-prepared liquid repellent layer has a thickness above 20 nm, because of the presence of the liquid repellent agent which is not chemically bound to the surface, i.e., merely deposited on the surface. The unreacted agent is removed in the post-treatment step by being washed with a liquid capable of dissolving the agent. The fluorine-based solvents cited above in "Preparation of liquid repellent agent solution" can be suitably used for the above purpose. More specifically, these solvents include Fluorinert FC-72, FC-77, PF-5060, PF-5080, HFE-7100 and HFE-7200 (3M), and Vertrel XF (Du Pont). The post-treatment step completes formation of the monomolecular liquid repellent layer on the magnesium fluoride surface.

(3) Measurement of Thickness and Refractive Index of Liquid Repellent Layer

Thickness of the liquid repellent layer at the perfluoropolyether or perfluoroalkyl chain portion was determined by IR spectroscopy. An absorption resulting from CF stretching vibration appears at around 1,200 kaysers. Thickness of the layer can be determined by absorbance using the calibration curve. Refractive index can be determined by ellipsometry.

(4) Applicable Areas

The lens of the present invention is applicable to and useful for various areas, including that for CCD cameras, digital cameras, microscopes and glasses, and front illuminator surfaces (which are partly of lens structure) for cars and trans, in addition to that for liquid crystal projectors.

The present invention is described in more detail by Examples, which by no means limit scope of the present invention.

EXAMPLE 1

(1) Synthesis of Liquid Repellent Agent

First, the liquid repellent agents (Compounds 1 to 13) used in Example 1 are described for their chemical structures and synthesis processes, except for those described earlier (Compounds 1 to 4).

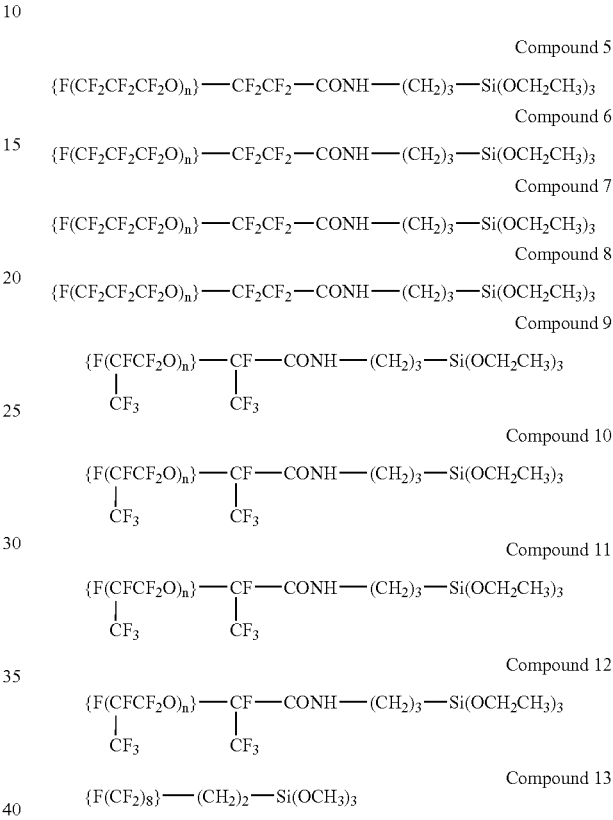

Of these, Compounds 5 to 12 were the liquid repellent agents having a perfluoropolyether chain, whereas Compound 13 was the one having a perfluoroalkyl chain. Compounds 5 to 12 were synthesized, whereas Compound 13 was supplied from the market. Table 1 summarizes the chemical structures of the fluorinated chains in the agents and their average molecular weights.

TABLE 1

Chemical structure and average molecular weight of the liquid repellent agent for the present invention

| Compound for the liquid repellent agent | Structure of liquid repellent fluorinated chain | Chemical structure of liquid repellent fluorinated chain | Average molecular weight of the liquid repellent fluorinated chain |
|---|---|---|---|
| 1 | linear perfluoropolyether chain | $F(CF_2CF_2CF_2O)_nCF_2CF_2$— | 4080 |
| 2 | linear perfluoropolyether chain | $F(CF_2CF_2CF_2O)_nCF_2CF_2$— | 4080 |
| 3 | linear perfluoropolyether chain | $F(CF_2CF_2CF_2O)_nCF_2CF_2$— | 4080 |

TABLE 1-continued

Chemical structure and average molecular weight of the liquid repellent agent for the present invention

| Compound for the liquid repellent agent | Structure of liquid repellent fluorinated chain | Chemical structure of liquid repellent fluorinated chain | Average molecular weight of the liquid repellent fluorinated chain |
|---|---|---|---|
| 4 | linear perfluoropolyether chain | $F(CF_2CF_2CF_2O)_nCF_2CF_2-$ | 4080 |
| 5 | linear perfluoropolyether chain | $F(CF_2CF_2CF_2O)_nCF_2CF_2-$ | 6900 |
| 6 | linear perfluoropolyether chain | $F(CF_2CF_2CF_2O)_nCF_2CF_2-$ | 2100 |
| 7 | linear perfluoropolyether chain | $F(CF_2CF_2CF_2O)_nCF_2CF_2-$ | 1680 |
| 8 | linear perfluoropolyether chain | $F(CF_2CF_2CF_2O)_nCF_2CF_2-$ | 418 |
| 9 | branched perfluoropolyether chain | $F(CFCF_2O)_nCF-$ with $CF_3$ branches | 6200 |
| 10 | branched perfluoropolyether chain | $F(CFCF_2O)_nCF-$ with $CF_3$ branches | 3800 |
| 11 | branched perfluoropolyether chain | $F(CFCF_2O)_nCF-$ with $CF_3$ branches | 2120 |
| 12 | branched perfluoropolyether chain | $F(CFCF_2O)_nCF-$ with $CF_3$ branches | 1880 |
| 13 | perfluoroalkyl chain | $F(CF_2)_8$ | 419 |

The methods for synthesizing Compounds 5 to 12 are described in detail below.

(Synthesis of Compound 5)

First, 69 parts by mass of Demnum SH (Daikin Kogyo, average molecular weight of the perfluoropolyether chain: 6,900) was dissolved in 200 parts by mass of Fluorinert PF-5080 (3M), to which 20 parts by mass of thionyl chloride was added. The mixture was stirred for 48 hours under reflux. This produced 70 parts by mass of the acid chloride of Demnum SH, after thionyl chloride and Fluorinert PF-5080 were removed by an evaporator. Then, the acid chloride was incorporated with 200 parts by mass of Fluorinert PF-5080 and cooled to 0° C., to which 3 parts by mass of Sila-Ace S330 (Chisso) and 30 parts by mass of triethylamine were added. The mixture was stirred for 2 hours at 0° C. and then for 20 hours at room temperature. The resultant reaction solution was filtered by RADIOLITE FINE FLOW A (Showa Chemical Industry), and Fluorinert PF-5080 in the filtrate was removed by an evaporator, to produce Compound 5 (66 parts by mass).

(Synthesis of Compound 6)

Compound 6 (18 parts by mass) was produced in the same manner as that for Compound 5, except that 69 parts by mass of Demnum SH (average molecular weight of the perfluoropolyether chain: 6,900) was replaced by 21 parts by mass of Demnum SH (average molecular weight of the perfluoropolyether chain: 2,100).

(Synthesis of Compound 7)

Compound 7 (12 parts by mass) was produced in the same manner as that for Compound 5, except that 69 parts by mass of Demnum SH (average molecular weight of the perfluoropolyether chain: 6,900) was replaced by 17 parts by mass of Demnum SH (average molecular weight of the perfluoropolyether chain: 1,680).

(Synthesis of Compound 8)

Compound 8 (2 parts by mass) was produced in the same manner as that for Compound 5, except that 69 parts by mass of Demnum SH (average molecular weight of the perfluoropolyether chain: 6,900) was replaced by 5 parts by mass of Demnum SH (average molecular weight of the perfluoropolyether chain: 418).

Demnum SH (average molecular weight of the perfluoropolyether chain: 418) was synthesized by the following procedure, because it is not commercially available. First, 50 parts by mass of Demnum SH (average molecular weight of the perfluoropolyether chain: 1,680), 100 parts by mass of Fluorinert HFE-7200 (3M) and 50 parts by mass of diethyl ether were stirred for 3 minutes in a separating funnel, and then allowed to stand for 12 hours. The mixture was separated into two layers. The upper layer was taken out and treated by an evaporator to remove diethyl ether essentially totally. It was then treated under a vacuum, produced by a vacuum pump, to further remove diethyl ether. This produced 5 parts by mass of Demnum SH (average molecular weight of the perfluoropolyether chain: 418).

(Synthesis of Compound 9)

Compound 9 (56 parts by mass) was produced in the same manner as that for Compound 5, except that 69 parts by mass of Demnum SH (average molecular weight of the perfluoropolyether chain: 6,900) was replaced by 62 parts by mass of Krytox 157FS-H (average molecular weight of the perfluoropolyether chain: 6,200).

(Synthesis of Compound 10)

Compound 10 (33 parts by mass) was produced in the same manner as that for Compound 5, except that 69 parts by mass of Demnum SH (average molecular weight of the perfluoropolyether chain: 6,900) was replaced by 62 parts by mass of Krytox 157FS-M (average molecular weight of the perfluoropolyether chain: 3,800).

(Synthesis of Compound 11)

Compound 11 (18 parts by mass) was produced in the same manner as that for Compound 5, except that 69 parts by mass of Demnum SH (average molecular weight of the perfluoropolyether chain: 6,900) was replaced by 22 parts by mass of Krytox 157FS-L (average molecular weight of the perfluoropolyether chain: 2,120).

(Synthesis of Compound 12)

Compound 12 (11 parts by mass) was produced in the same manner as that for Compound 5, except that 69 parts by mass of Demnum SH (average molecular weight of the perfluoropolyether chain: 6,900) was replaced by 16 parts by mass of Krytox 157FS-L (average molecular weight of the perfluoropolyether chain: 1,580). The structure and average molecular weight of the fluorinated liquid repellent chain in each of the liquid repellent agents used in Example 1 are summarized in Table 1.

(2) Treatment Lens with Liquid Repellent Agent Solution (i) Preparation of Solution for Liquid Repellent Treatment First, a liquid repellent agent is diluted with a fluorinated solvent, to prepare a solution for liquid repellent treatment. Each of Compounds 1 to 13 was diluted with Fluorinert PF-5080 (3M) as a fluorinated solvent to a concentration of 0.3% by mass. Thus, the solutions for liquid repellent treatment were prepared, each with Compounds 1 to 13 serving as the liquid repellent agent.

(ii) Treatment with Plasma

A convex lens, 40 mm in diameter, and 3.5 and 1.5 mm thick at the center and edges, was prepared. The lens was coated with a 3-layered anti-reflective membrane composed of a cesium fluoride, zirconium oxide and magnesium fluoride layers in this order from the lens. The coated lens was irradiated with oxygen plasma using a plasma dry cleaner (YAMATO Glass Company, PDC-210) under the conditions of rf output: 300 W and treatment time: 50 seconds.

(iii) Treatment with Liquid Repellent Agent Solution

The coated lens was immersed in the liquid repellent agent solution for 10 minutes, as soon as it was irradiated with oxygen plasma.

(iv) Heating

The coated lens treated with the liquid repellent agent solution was heated in a constant-temperature tank kept at 120° C. inside for 10 minutes.

(v) Cleaning

The heat-treated lens was then immersed in Fluorinert PF-5080 (3M) for 30 seconds and withdrawn. It was then sprayed with Fluorinert PF-5080 (3M) by a pipette, to remove the surplus agent not chemically bound to the surface. This produced the lens coated with the liquid repellent layer. It was evaluated by the following procedures. For comparison, the coated lens not irradiated with oxygen plasma was treated with the liquid repellent agent solution, and evaluated similarly.

(3) Evaluation of the Lens (i) Surface Analysis

The lens was analyzed by X-ray photoelectron spectroscopy (analyzer: Shimadzu/KRATOS, AXIS-HS) for the composition on and near the surface before and after it was irradiated with oxygen plasma, and also after it was treated with the liquid repellent agent solution. The measurement was controlled to observe the composition in a range from the surface to a depth of 3 nm. The lens had the signal due to magnesium in magnesium fluoride at a bond energy of 51.6 electron volts (eV), before it was irradiated with oxygen plasma. The signal due to magnesium in magnesium oxide appeared a new at a bond energy of 50.5 eV, after it was irradiated with oxygen plasma, which was accompanied by reduced intensity of the signal due to magnesium in magnesium fluoride. The signal due to magnesium remained essentially unchanged before and after it was treated with the liquid repellent agent solution. The signal due to magnesium in magnesium oxide was not observed clearly with the lens treated with the liquid repellent agent solution without having been irradiated with oxygen plasma.

These results indicate that an oxide layer is formed on the lens surface, when it is irradiated with oxygen plasma. The magnesium fluoride/magnesium oxide abundance ratio on and near the surface was estimated from the signal intensity, shape and the like. The ratio was 90% or more/10% or less with the lens before it was irradiated with oxygen plasma, whereas it was almost 50%/50% after the plasma-treatment.

(ii) Measurement of light transmittance

The lens was measured for its light transmittance before and after it was treated with the liquid repellent agent solution, for which light having a wavelength of 400 to 700 nm, generally accepted as the visible light range, was used. The lens showed a transmittance of 97% or more in the above wavelength range, whether or not it was treated with the liquid repellent agent solution for the present invention. Therefore, it is confirmed that the coated lens should cause no problems for practical purposes.

(iii) Measurement of Lens Surface Resistance

The lens was also measured for its surface resistance before and after it was treated with the liquid repellent agent solution, in accordance with ASTM D-257. The lens showed a surface resistance of $10^{13}$ to $10^{14}$ Ω, whether or not it was treated with the liquid repellent agent solution. Therefore, it is confirmed that the treatment with the solution, carried out in Example 1, causes no change in surface resistance.

(iv) Test of Liquid Repellent Agent Solution

Liquid repellency of the coated lens was evaluated by its contact angle with water before and after the treatment with the solution, using a contact angle meter (KYOWA INTERFACE SCIENCE CO., LTD, CAD-1). The results are given in Table 2. The lens had a contact angle of 43 to 44° with water before the treatment.

TABLE 2

Results of the liquid repellent agent solution test and wear resistance test

| Compound for the liquid repellent agent | Chemical structure and average molecular weight of the fluorinated chain | | Contact angle of the lens, irradiated with plasma before treatment with the liquid repellent agent, with water (°) | | | | Contact angle of the lens, not irradiated with plasma, with water (°) | |
|---|---|---|---|---|---|---|---|---|
| | Chemical structure of the fluorinated chain | Average molecular weights of the fluorinated chain | Load used in the wear resistance test: 300 g | | | Load used in the wear resistance test: 1000 g | Load used in the wear resistance test: 300 g | |
| | | | Sliding cycles: 0 | Sliding cycles: 100 | Sliding cycles: 1000 | Sliding cycles: 100 | Sliding cycles: 0 | Sliding cycles: 100 |
| 1 | Linear perfluoropolyether chain | 4080 | 113 | 107 | 104 | 105 | 86 | 68 |
| 2 | Linear perfluoropolyether chain | 4080 | 113 | 107 | 104 | 105 | 86 | 67 |
| 3 | Linear perfluoropolyether chain | 4080 | 113 | 107 | 104 | 105 | 86 | 68 |
| 4 | Linear perfluoropolyether chain | 4080 | 113 | 109 | 105 | 107 | 88 | 69 |
| 5 | Linear perfluoropolyether chain | 6900 | 114 | 108 | 105 | 106 | 88 | 70 |
| 6 | Linear perfluoropolyether chain | 2100 | 112 | 106 | 103 | 104 | 82 | 66 |
| 7 | Linear perfluoropolyether chain | 1680 | 112 | 105 | 81 | 102 | 82 | 66 |
| 8 | Linear perfluoropolyether chain | 418 | 110 | 103 | 74 | 100 | 78 | 62 |
| 9 | Branched perfluoropolyether chain | 6200 | 112 | 107 | 104 | 88 | 58 | 47 |
| 10 | Branched perfluoropolyether chain | 3800 | 111 | 106 | 103 | 87 | 56 | 46 |
| 11 | Branched perfluoropolyether chain | 2120 | 110 | 105 | 102 | 86 | 54 | 45 |
| 12 | Branched perfluoropolyether chain | 1880 | 110 | 103 | 81 | 83 | 54 | 45 |
| 13 | Perfluoroalkylether chain | 419 | 108 | 86 | 70 | 70 | 58 | 45 |

It is confirmed that the treatment of the lens with each liquid repellent agent solution improves its liquid repellency, because it showed a contact angle of 43 to 44° with water before the treatment and a higher angle after the treatment. It is also confirmed that the treatment of the lens with oxygen plasma before treatment with the liquid repellent agent solution improves its liquid repellency, because each of the plasma-treated lenses showed a higher angle (100° or more) than the untreated one.

(iv) Wear Resistance Test

Figure 4:
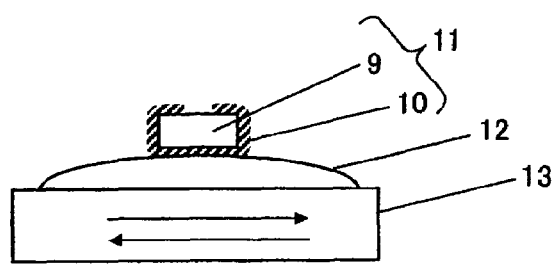
FIG. 4 outlines the wear resistance tester.

FIG. 4 outlines the wear resistance tester. This test is to observe damages of the liquid repellent layer when the lens is wiped with cloth to remove stain. Referring to FIG. 4, the eight sheets of gauze 10 (specified by Japanese Pharmacopoeia), laid one on top of another, are wound around and fixed on the aluminum specimen 9, 10 by 10 by 4 mm in size. The specimen 9 and gauzes 9 constitute the sliding material 11 for the wear resistance test. Sliding the material 11 on the lens simulates wiping of the lens with cloth, e.g., handkerchief.

The sliding material 11 was slid on the lens 12 treated with the liquid repellent agent solution, set on the reciprocating friction tester table 13, to observe changed liquid repellency of the lens before and after the test by changed contact angle with water. The test was carried out under the conditions of sliding load: 300 or 1000 g, and sliding length: 10 mm. The results are given in Table 2, together with the liquid repellent agent solution test results, where "sliding number" means reciprocating cycle number. The lens irradiated with ozone plasma and that not irradiated with the plasma are described below.

a) Lens Irradiated with Oxygen Plasma

Each of the lenses irradiated with oxygen plasma had a contact angle of 100° or more with water before it was subjected to the wear resistance test, indicating that it had higher water repellency than the lens before it was treated with the liquid repellent agent solution, having the contact angle of 43 to 44°. Each of the lenses treated with one of Compounds 1 to 12 as the liquid repellent agent having a perfluoropolyether chain retained the angle of 100° or more, after it was subjected to 100 sliding cycles under a load of 300 g. On the other hand, the lens treated with Compound 13 having a perfluoroalkyl chain had the angle decreased to 86°. Each of the lenses treated with the compound having a perfluoropolyether chain retained the angle of 100° or more after it was subjected to 1000 sliding cycles, when the perfluoropolyether chain had an average molecular weight of 2000 or more (Compounds 1 to 6, and 9 to 11). However, it had the angle decreased to 74 to 81°, when the perfluoropolyether chain had an average molecular weight of below 2000 (Compounds 7, 8 and 12).

These results indicate that the lens loses liquid repellency to a limited extent in the wear resistance test involving a number of sliding cycles, i.e., friction cycles, when treated with the liquid repellent agent which contains a perfluoropolyether chain having an average molecular weight of 2,000 or more.

In the wear resistance test carried out under a load of 1000 g, on the other hand, each of the lenses treated with the agent having a linear perfluoropolyether chain (Compounds 1 to 8) retained the angle of 100° or more. However, that treated with the agent having a branched perfluopolyether chain had the angle decreased to 83 to 88°. These results indicate that the lens loses liquid repellency to a limited extent in the wear resistance test carried out under an increased load, where it was rubbed more heavily, when treated with the liquid repellent agent which contains a linear perfluoropolyether chain.

b) Lens not Irradiated with Oxygen Plasma

The lens not irradiated with oxygen plasma had a contact angle of low 54 to 88°, before it was subjected to the wear resistance test. This compares with 108 to 113° of the lens irradiated with oxygen plasma. The lens not irradiated with oxygen plasma lacks the surface oxide layer, by which the alkoxysilane residue in the liquid repellent agent is chemically bound to the surface. The alkoxysilane residue, when chemically bound to the surface, gives a number of the fluorinated liquid repellent chains on the surface. In the absence of the chemical bond, on the other hand, the liquid repellent agent merely sticks to the lens surface at random. It is therefore considered that the presence of the alkoxysilane residue merely sticking to the liquid repellent layer surface, in addition to the fluorinated liquid repellent chain, decreases liquid repellency and hence contact angle.

Next, the lens was subjected to 100 sliding cycles under a load of 100 g, to lose the contact angle to 45 to 70°. It is thus confirmed that the liquid repellent layer is significantly less resistant to wear than the one irradiated with oxygen plasma, conceivably because the liquid repellent agent not chemically bound to the surface is wiped off by gauze.

It is thus clearly demonstrated that the liquid repellent layer becomes highly resistant to wear, when irradiated with oxygen plasma to have the surface oxide layer.

EXAMPLE 2

The lens was treated with the liquid repellent agent in the same manner as in Example 1, except that it was beforehand irradiated with ozone or UV in place of oxygen plasma. It was irradiated with a gas stream containing ozone at 25 N/m$^3$, generated by an ozone generator (ROKI TECHNO. Co., Ltd., BA), for 100 minutes, or with UV, generated by a UV lamp (Ushio Inc., DEEP-UV), for 30 minutes.

(i) Surface Analysis

The lens surface was analyzed by XPS as in Example 1. The lens irradiated with ozone or UV had the signal due to magnesium oxide on and near the surface. This confirms formation of the oxide layer on the surface, as is the lens irradiated with oxygen plasma.

The magnesium fluoride/magnesium oxide abundance ratio on and near the surface was estimated from the signal intensity, shape and the like. The ratio was 90% or more/10% or less with the lens before it was irradiated with ozone or UV, whereas it was almost 50%/50% after the ozone- or UV-treatment, by which is meant that the magnesium oxide is formed in the lens irradiated with ozone or UV to essentially the same extent as in the lens irradiated with oxygen plasma.

(ii) Measurement of Light Transmittance

The lens was measured for its light transmittance before and after it was treated with the liquid repellent agent solution in the same manner as in Example 1. The lens showed a transmittance of 97% or more in a wavelength range from 400 to 700 nm, whether or not it was treated with the liquid repellent agent solution for the present invention. Therefore, it is confirmed that the coated lens should cause no problems for practical purposes.

(iii) Measurement of Lens Surface Resistance

The lens was also measured for its surface resistance before and after it was treated with the liquid repellent agent solution in the same manner as in Example 1. The lens showed a surface resistance of $10^{13}$ to $10^{14}$ Ω, whether or not it was treated with the liquid repellent agent solution. Therefore, it is confirmed that the treatment with the solution, carried out in Example 2, causes no change in surface resistance.

(iv) Test of Liquid Repellent Agent Solution

Liquid repellency of the coated lens was evaluated by its contact angle with water before and after the treatment with the solution in the same manner as in Example 1. The results are given in Table 3.

TABLE 3

Results of the liquid repellent agent solution test and wear resistance test

| Compound for the liquid repellent agent | Chemical structure and average molecular weight of the fluorinated chain Chemical structure of the fluorinated chain | Average molecular weight of the fluorinated chain | Contact angle of the lens, irradiated with ozone before treatment with the liquid repellent agent, with water (°) | | Contact angle of the lens, irradiated with UV before treatment with the liquid repellent agent, with water (°) | | Contact angle of the lens, not irradiated with ozone or UV, with water (°) | |
|---|---|---|---|---|---|---|---|---|
| | | | Before sliding | After 100 sliding cycles | Before sliding | After 100 sliding cycles | Before sliding | After 100 sliding cycles |
| 1 | Linear perfluoropolyether chain | 4080 | 113 | 105 | 112 | 104 | 86 | 68 |

TABLE 3-continued

Results of the liquid repellent agent solution test and wear resistance test

| Compound for the liquid repellent agent | Chemical structure and average molecular weight of the fluorinated chain — Chemical structure of the fluorinated chain | Average molecular weight of the fluorinated chain | Contact angle of the lens, irradiated with ozone before treatment with the liquid repellent agent, with water (°) | | Contact angle of the lens, irradiated with UV before treatment with the liquid repellent agent, with water (°) | | Contact angle of the lens, not irradiated with ozone or UV, with water (°) | |
|---|---|---|---|---|---|---|---|---|
| | | | Before sliding | After 100 sliding cycles | Before sliding | After 100 sliding cycles | Before sliding | After 100 sliding cycles |
| 2 | Linear perfluoropolyether chain | 4080 | 113 | 105 | 112 | 104 | 86 | 67 |
| 3 | Linear perfluoropolyether chain | 4080 | 113 | 105 | 112 | 104 | 86 | 68 |
| 4 | Linear perfluoropolyether chain | 4080 | 113 | 106 | 112 | 104 | 88 | 69 |
| 5 | Linear perfluoropolyether chain | 6900 | 114 | 106 | 113 | 104 | 88 | 70 |
| 6 | Linear perfluoropolyether chain | 2100 | 112 | 104 | 112 | 104 | 82 | 66 |
| 7 | Linear perfluoropolyether chain | 1680 | 112 | 103 | 111 | 103 | 82 | 66 |
| 8 | Linear perfluoropolyether chain | 418 | 110 | 101 | 109 | 100 | 78 | 62 |
| 9 | Branched perfluoropolyether chain | 6200 | 112 | 105 | 111 | 105 | 58 | 47 |
| 10 | Branched perfluoropolyether chain | 3800 | 111 | 104 | 110 | 103 | 56 | 46 |
| 11 | Branched perfluoropolyether chain | 2120 | 110 | 103 | 109 | 103 | 54 | 45 |
| 12 | Branched perfluoropolyether chain | 1880 | 110 | 102 | 109 | 103 | 54 | 45 |
| 13 | Perfluoroalkylether chain | 419 | 108 | 82 | 106 | 81 | 58 | 45 |

Sliding load: 300 g

It is confirmed that the treatment of the lens with each liquid repellent agent solution improves its liquid repellency, because it showed a contact angle of 43 to 44° with water before the treatment and a higher angle after the treatment. It is also confirmed that the treatment of the lens with ozone or UV before treatment with the liquid repellent agent solution improves its liquid repellency, because each of the ozone- or UV-treated lenses showed a higher angle (100° or more) than the untreated one.

(iv) Wear Resistance Test

Wear resistance of the liquid repellent layer on the lens was analyzed in the same manner as in Example 1, where the test was carried out using one level of load (300 g). The results are also given in Table 3.

a) Lens Irradiated with Ozone

Each of the lenses irradiated with ozone had a contact angle of 100° or more with water before it was subjected to the wear resistance test, indicating that it had higher water repellency than the untreated lens having the contact angle of 54 to 88°. This confirms that the ozone treatment is as effective as the plasma treatment for forming the oxide layer on the lens surface.

Each of the lenses treated with one of Compounds 1 to 12 as the liquid repellent agent having a perfluoropolyether chain retained the angle of 100° or more, after it was subjected to 100 sliding cycles under a load of 300 g. On the other hand, the lens treated with Compound 13 having a perfluoroalkyl chain had the angle decreased to 82°. It is thus demonstrated that the liquid repellent agent having a perfluoropolyether chain gives the liquid repellent layer of higher wear resistance.

b) Lens Irradiated with UV

Each of the lenses irradiated with UV had a contact angle of 100° or more with water before it was subjected to the wear resistance test, indicating that it had higher water repellency than the untreated lens having the contact angle of 54 to 88°. This confirms that the UV treatment is as effective as the plasma treatment for forming the oxide layer on the lens surface.

Each of the lenses treated with one of Compounds 1 to 12 as the liquid repellent agent having a perfluoropolyether chain retained the angle of 100° or more, after it was subjected to 100 sliding cycles under a load of 300 g. On the other hand, the lens treated with Compound 13 having a perfluoroalkyl chain had the angle decreased to 82°. It is thus demonstrated that the liquid repellent agent having a perfluoropolyether chain gives the liquid repellent layer of higher wear resistance.

EXAMPLE 3

Figure 5:
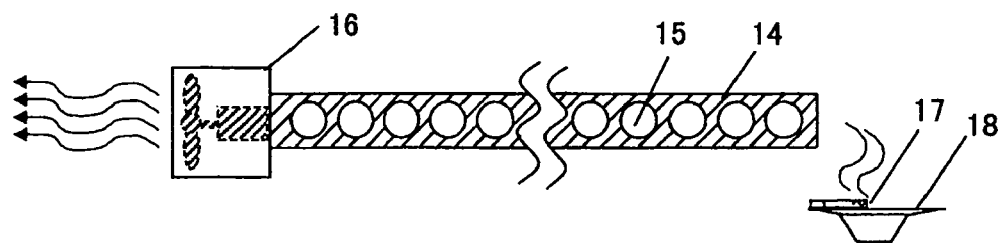
FIG. 5 outlines an experimental system for mist-sticking test.

FIG. 5 schematically outlines an experimental system for mist-sticking test, carried out to confirm mist-proof ability of the lens, where smoke from a lit cigarette was used as a pollutant. Referring to FIG. 5, a plurality of the lenses coated with the liquid repellent layer, prepared in Example 1, were set in cavities in the cylinder 14. A fan was provided at one end of the cylinder 14, slowly rotating in the air discharging direction. An ash tray holding the lit cigarette 17 was set at the other end of the cylinder 14. The smoke from the cigarette 17 was directed into, and discharged from, the cylinder 14 by the rotating fan 16. The mist, e.g., tar, in the smoke began to stick to the inner wall of the cylinder 14 and exposed lens 15 surfaces. They were continuously exposed to the smoke for 10 minutes by replacing a cigarette when it no longer gave off smoke by a new lit one. Then, the lenses were withdrawn and measured for transmittance of light having a wavelength in a rage from 400 to 700 in the same manner as in Example 1. The results are given in Table 4.

TABLE 4

Results of the mist-sticking test

| Compound for the liquid repellent agent | Chemical structure and average molecular weight of the fluorinated chain | | Pretreatment for coating the lens with the liquid repellent agent | | | | | | | |
|---|---|---|---|---|---|---|---|---|---|---|
| | Chemical structure of the fluorinated chain | Average molecular weight of the fluorinated chain | Lens not pretreated | | Lens irradiated with ozone plasma | | Lens irradiated with UV | | Lens exposed with ozone | |
| | | | Before test | After test | Before test | After test | Before test | After test | Before test | After test |
| 1 | Linear perfluoropolyether chain | 4080 | 97 or more | 78 | 97 or more | 94 | 97 or more | 92 | 97 or more | 92 |
| 2 | Linear perfluoropolyether chain | 4080 | 97 or more | 78 | 97 or more | 94 | 97 or more | 92 | 97 or more | 92 |
| 3 | Linear perfluoropolyether chain | 4080 | 97 or more | 78 | 97 or more | 94 | 97 or more | 92 | 97 or more | 92 |
| 4 | Linear perfluoropolyether chain | 4080 | 97 or more | 78 | 97 or more | 94 | 97 or more | 92 | 97 or more | 92 |
| 5 | Linear perfluoropolyether chain | 6900 | 97 or more | 79 | 97 or more | 94 | 97 or more | 92 | 97 or more | 92 |
| 6 | Linear perfluoropolyether chain | 2100 | 97 or more | 76 | 97 or more | 93 | 97 or more | 92 | 97 or more | 92 |
| 7 | Linear perfluoropolyether chain | 1680 | 97 or more | 76 | 97 or more | 93 | 97 or more | 92 | 97 or more | 92 |
| 8 | Linear perfluoropolyether chain | 418 | 97 or more | 74 | 97 or more | 91 | 97 or more | 90 | 97 or more | 90 |
| 9 | Branched perfluoropolyether chain | 6200 | 97 or more | 78 | 97 or more | 94 | 97 or more | 92 | 97 or more | 92 |
| 10 | Branched perfluoropolyether chain | 3800 | 97 or more | 77 | 97 or more | 94 | 97 or more | 92 | 97 or more | 92 |
| 11 | Branched perfluoropolyether chain | 2120 | 97 or more | 76 | 97 or more | 93 | 97 or more | 92 | 97 or more | 92 |
| 12 | Branched perfluoropolyether chain | 1880 | 97 or more | 76 | 97 or more | 93 | 97 or more | 92 | 97 or more | 92 |

TABLE 4-continued

Results of the mist-sticking test

| Compound for the liquid repellent agent | Chemical structure and average molecular weight of the fluorinated chain | | Pretreatment for coating the lens with the liquid repellent agent | | | | | | |
|---|---|---|---|---|---|---|---|---|---|
| | | Average molecular weight of the fluorinated chain | Lens not pretreated | | Lens irradiated with ozone plasma | | Lens irradiated with UV | | Lens exposed with ozone |
| | Chemical structure of the fluorinated chain | | Before test | After test | Before test | After test | Before test | After test | Before test | After test |
| 13 | Perfluoroalkylether chain | 419 | 97 or more | 73 | 97 or more | 91 | 97 or more | 90 | 97 or more | 90 |

Minimum transmittance of light having a wavelength from 400 to 700 nm, Unit: %

Each of the lenses had a transmittance of 97% or more in the above wavelength range, before it was coated with the liquid repellent agent solution. The coated lens also had a transmittance of 97%, whether it was not pretreated, or pretreated with oxygen plasma, UV or ozone, as shown in Table 4. Thus, decrease in transmittance by the treatment with the liquid repellent agent solution or the pretreatment therefor was not clearly observed. The uncoated lens had a transmittance decreased to 70%, when subjected to the mist-sticking test, where the decrease was particularly noted at a short wavelength of around 400 nm.

The lens coated with the liquid repellent agent solution without having been pretreated had a transmittance decreased resultingly to 73 to 78%, although to a slightly lower extent than that of the uncoated lens, after the mist-sticking test, whereas the lens coated with the liquid repellent agent solution after having been pretreated with oxygen plasma, UV or ozone to form the oxide layer had a transmittance of 90% or more.

It is demonstrated, as discussed above, that the lens coated with the liquid repellent layer of the compound having a perfluoropolyether or perfluoroalkyl chain has a light transmittance effectively prevented from decreasing in the mist-sticking test, when treated to have the surface oxide layer.

COMPARATIVE EXAMPLE 1

Thickness of each of the liquid repellent layers prepared in Examples 1 and 2 on the lens was determined by IR spectroscopy based on the CF stretching vibration at around 1,200 kaysers, due to the liquid repellent layer. These layers were 3 to 11 nm thick. It was observed that the liquid repellent fluorinated chain having a higher average molecular weight in the liquid repellent agent tended to give a thicker liquid repellent layer.

Next, a liquid repellent layer of a fluorine-based resin was prepared to measure its wear resistance and mist-proof ability. The fluorine-based resin was Cytop CTL-107M (ASAHI GLASS COMPANY), diluted to 0.3% by mass with an attached solvent. The resulting coating solution was spread over a lens by spin coating, and heated at 180° C. for 1 hour to form the liquid repellent layer. Two types of the lenses coated with the liquid repellent layer of different thickness, 3 and 11 nm, were prepared by changing spin coating speed. These layers were measured for wear resistance and mist-proof ability by the respective wear resistance test and mist-sticking test carried out in the same manner as in Examples 2 and 3.

The lenses coated with the liquid repellent layer had a contact angle of 108° with water, irrespective of layer thickness. Each had a contact angle decreased to 44° after it was subjected to 100 sliding cycles under a load of 300 g. This contact angle is essentially on a par with that of the uncoated one, from which it is judged that the liquid repellent layer comes off by the friction.

The coated lens showed a transmittance of 97% or more in a wavelength range from 400 to 700 nm, irrespective of layer thickness before the mist-sticking test. The tested lens coated with the 3 or 11 nm thick liquid repellent layer had a transmittance decreased to 67 or 64%, respectively. These lenses were measured for layer surface resistance in the same manner as in Example 1. The lens coated with the 3 or 11 nm thick liquid repellent layer had a surface resistance of $10^{16}$ or $10^{17}$ $\Omega$, respectively, which were higher than that of the uncoated lens ($10^{13}$ to $10^{14}$ $\Omega$). It is therefore considered that they are more easily charged with static electricity on the surface to attract more mist.

It is demonstrated, as discussed above, that the lens coated with the liquid repellent layer of the compound having a perfluoropolyether or perfluoroalkyl chain has high wear resistance and mist-proof ability.

EXAMPLE 4

The liquid crystal projectors were produced, each using the lens coated with the liquid repellent layer of one of Compounds 1 to 13, prepared in Example 1. All of these lenses were irradiated with oxygen plasma before having been treated with the liquid repellent agent solution. A liquid crystal projector was also produced using a lens not coated with the liquid repellent layer, for comparison.

Figure 6:
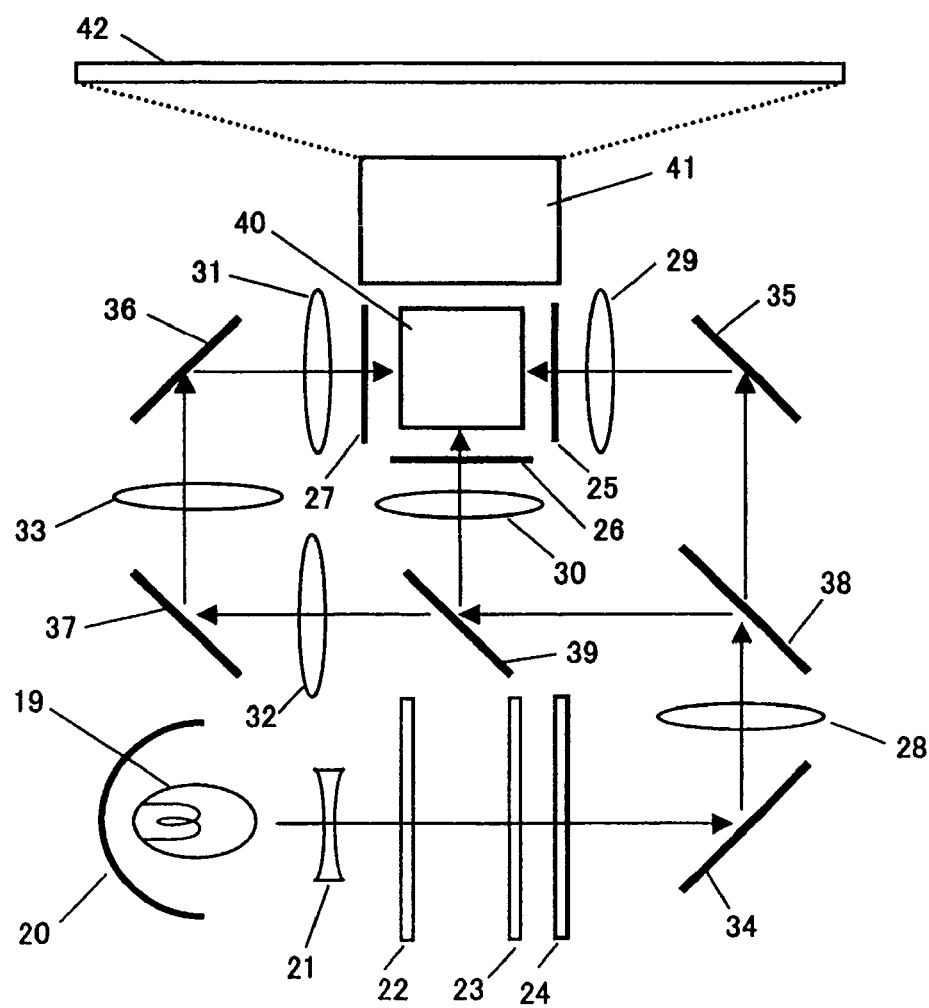
FIG. 6 schematically illustrates an optical system for the liquid-crystal projector of the present invention.

FIG. 6 schematically illustrates an optical system for the projection type display apparatus (liquid-crystal projector) of the present invention. First, the optical system is described. White light emitted from the light source 19 is collected by the reflector 20, and directed towards the first lens array 22 via the concave lens 21. The first lens array 22 divides the incident light beam into a plurality of beams to allow light to efficiently pass through the second lens array 23 and polarization converter 24. The second lens array 23 is composed of lens cells which project the images on the corresponding cells in the first lens array 22 onto the display devices 25, 26 and 26, which correspond to the three primitive colors of red, green and blue (RBG). The projected image on each of the lens cells in the first lens array 22 is superimposed on the image on the display device 25, 26 or 27 by the condenser lens 28, condenser lenses 29, 30 and 31, first relay lens 32, and second relay lens 33.

The optical system is also equipped with the mirrors 34 to 37 to deflect light in the system. The white light emitted from the light source 19 is deflected by these mirrors, and separated into the three primitive colors R, G and B by the dichroic mirrors 38 and 39 to be directed towards the corresponding display devices 25, 26 and 27. The images on the display devices 25, 26 and 27 are color-synthesized by the dichroic-cross-prism 40, and then projected onto the screen 42 by the projection lens 41, to be displayed on the screen 42 of large size. The first relay lens 32 and second relay lens 33 are provided to compensate for a longer light path from the light source 19 to the display device 27 than to the display devices 25 and 26. The condenser lenses 29, 30 and 31 are provided to suppress divergence of light transmitted by the display devices 25, 26 and 27, in order to efficiently project the images by the projection lens 41.

A total of the six lenses prepared in Example 1 were used in the liquid-crystal projector; condenser lens 28, condenser lenses 29, 30 and 31, and first relay lens 32 and second relay lens 33.

First, brightness of the image on the screen 42 of the liquid crystal projector equipped with the above optical system was measured by a brightness meter. Next, the air intake port of a fan (not shown) for cooling the light source 19 in the liquid crystal projector was set near the fan which was used in the experimental system for the mist-sticking test, and smoke was discharged continuously into the projector inside for 10 minutes. Then, brightness of the image on the screen 42 was measured again. The image displayed by the liquid crystal projector which used the lens coated with the liquid repellent layer of each of Compounds 1 to 13 lost brightness by 10% or less. On the other hand, the image displayed by the liquid crystal projector which used an uncoated lens lost brightness by 20 to 25%. It is thus demonstrated that the liquid crystal projector which used the lens of the present invention is an excellent display apparatus of high mist-proof ability. The apparatus shown in FIG. 6 uses a transmission display device. However, the present invention can bring a similar effect when applied to an apparatus which uses a reflective display device.

EXAMPLE 5

A transparent resin plate, 100 by 100 mm in area and 2 mm thick (Polyplastics, TOPAS 5013), in place of a lens, was irradiated with oxygen plasma, ozone or UV and then treated with the liquid repellent agent solution of one of Compounds 1 to 13 in the same manner as in Example 1 or 2, except that it was treated with the agent solution at 80° C. for 3 hours instead of 120° C. for 10 minutes. Each was subjected to the mist-sticking test to observe its mist-proof ability. The results are given in Table 5.

TABLE 5

Results of the mist-sticking test

| Compound for the liquid repellent agent | Chemical structure and average molecular weight of the fluorinated chain | | Pretreatment for coating the lens with the liquid repellent agent | | | | | | | |
|---|---|---|---|---|---|---|---|---|---|---|
| | | | Lens not pretreated | | Lens irradiated with ozone plasma | | Lens irradiated with UV | | Lens exposed with ozone | |
| | Chemical structure of the fluorinated chain | Average molecular weight of the fluorinated chain | Before test | After test | Before test | After test | Before test | After test | Before test | After test |
| 1 | Linear perfluoropolyether chain | 4080 | 91 | 71 | 91 | 86 | 91 | 86 | 91 | 86 |
| 2 | Linear perfluoropolyether chain | 4080 | 91 | 71 | 91 | 86 | 91 | 86 | 91 | 86 |
| 3 | Linear perfluoropolyether chain | 4080 | 91 | 71 | 91 | 86 | 91 | 86 | 91 | 86 |
| 4 | Linear perfluoropolyether chain | 4080 | 91 | 71 | 91 | 86 | 91 | 86 | 91 | 86 |
| 5 | Linear perfluoropolyether chain | 6900 | 91 | 71 | 91 | 86 | 91 | 86 | 91 | 86 |
| 6 | Linear perfluoropolyether chain | 2100 | 91 | 71 | 91 | 86 | 91 | 85 | 91 | 85 |
| 7 | Linear perfluoropolyether chain | 1680 | 91 | 69 | 91 | 84 | 91 | 83 | 91 | 83 |
| 8 | Linear perfluoropolyether chain | 418 | 91 | 66 | 91 | 82 | 91 | 81 | 91 | 82 |
| 9 | Branched perfluoropolyether chain | 6200 | 91 | 71 | 91 | 86 | 91 | 86 | 91 | 86 |

TABLE 5-continued

Results of the mist-sticking test

| Compound for the liquid repellent agent | Chemical structure and average molecular weight of the fluorinated chain | | Pretreatment for coating the lens with the liquid repellent agent | | | | | | | |
|---|---|---|---|---|---|---|---|---|---|---|
| | | Average molecular weight of the fluorinated chain | Lens not pretreated | | Lens irradiated with ozone plasma | | Lens irradiated with UV | | Lens exposed with ozone | |
| | Chemical structure of the fluorinated chain | | Before test | After test | Before test | After test | Before test | After test | Before test | After test |
| 10 | Branched perfluoropolyether chain | 3800 | 91 | 70 | 91 | 86 | 91 | 85 | 91 | 85 |
| 11 | Branched perfluoropolyether chain | 2120 | 91 | 70 | 91 | 86 | 91 | 84 | 91 | 84 |
| 12 | Branched perfluoropolyether chain | 1880 | 91 | 68 | 91 | 84 | 91 | 83 | 91 | 83 |
| 13 | Perfluoroalkylether chain | 419 | 91 | 62 | 91 | 82 | 91 | 81 | 91 | 81 |

Minimum transmittance of light having a wavelength from 400 to 700 nm, Unit: %

Each of the plates had a transmittance of 91% or more in the above-described wavelength range, before it was coated with the liquid repellent agent solution. The coated plate also had a transmittance of 91%, whether it was not pretreated, or pretreated with oxygen plasma, UV or ozone, as shown in Table 5. Thus, decrease in transmittance by the treatment with the liquid repellent agent solution or the pretreatment therefor was not clearly observed.

The uncoated plate had a transmittance decreased to 56%, when subjected to the mist-sticking test, where the decrease was particularly noted at a short wavelength of around 400 nm.

The plate coated with the liquid repellent agent solution without having been pretreated had a transmittance decreased resultingly to 62 to 71%, although to a slightly lower extent than that of the uncoated plate, after the mist-sticking test.

On the other hand, each of the plates coated with the liquid repellent agent solution after having been pretreated with oxygen plasma, UV or ozone to form the oxide layer had a transmittance of 80% or more.

It is considered that the oxide layer, when formed, allows each of Compounds 1 to 13 serving as the liquid repellent agent to be bound to the transparent resin plate surface, leading to improved liquid repellency of the plate.

It is demonstrated, as discussed above, that the transparent resin plate coated with the liquid repellent layer of the compound having a perfluoropolyether or perfluoroalkyl chain has high mist-proof ability, when treated to have the oxide layer between the plate surface and liquid repellent layer.

The transparent resin plate lacks an oxide layer, when it is not pretreated with oxygen plasma, ozone or UV. However, the pretreatment oxidizes the surface to generate carboxyl group or the like. This can be confirmed by infrared spectroscopy. More specifically, the surface shows no signal due to stretching vibration of CO at around 1800 to 1600 kaysers before the pretreatment. However, the pretreatment with oxygen plasma, ozone, UV or the like oxidizes the surface to form carboxyl group, which is confirmed by an absorption due to stretching vibration of CO in carboxyl group, appearing at 1630 kaysers.

COMPARATIVE EXAMPLE 2

Thickness of each of the liquid repellent layers prepared in Example 5 on the transparent resin plate was determined in the same manner as in Comparative Example 1. These layers were 3 to 11 nm thick. It was observed that the liquid repellent fluorinated chain having a higher average molecular weight in the liquid repellent agent tended to give a thicker liquid repellent layer, also in this case.

Next, a liquid repellent layer of a fluorine-based resin was prepared to measure its wear resistance and mist-proof ability. The fluorine-based resin was Cytop CTL-107M (ASAHI GLASS COMPANY), diluted to 0.3% by mass with an attached solvent. The resulting coating solution was spread over a transparent resin plate by spin coating, and heated at 80° C. for 1 hour to form the liquid repellent layer. Two types of the transparent resin plates coated with the liquid repellent layer of different thickness, 3 and 11 nm, were prepared by changing spin coating speed. These layers were measured for mist-proof ability by the mist-sticking test carried out in the same manner as in Example 3.

The transparent resin plates coated with the liquid repellent layer showed a transmittance of 90% in a wavelength range from 400 to 700 nm, irrespective of layer thickness before the mist-sticking test. The tested plate coated with the 3 or 11 nm thick liquid repellent layer had a transmittance decreased to 53 or 50%, respectively. These plates were measured for layer surface resistance in the same manner as in Example 1. These plates coated with the liquid repellent layer had a surface resistance of $10^{18}$ Ω, irrespective of layer thickness, which was higher than that of the uncoated plate ($10^{15}$ to $10^{16}$ Ω). It is therefore considered that they are more easily charged with static electricity on the surface to attract more mist.

It is demonstrated, based on the results of Example 5 and Comparative Example 2, that the transparent component coated with the liquid repellent layer of the compound having a perfluoropolyether or perfluoroalkyl chain has high mist-proof ability, when treated to have the oxide layer between the component surface and liquid repellent layer.

It is also demonstrated that a transparent component, not limited to a resin plate, having no oxide layer can show high mist-proof ability, when coated with the liquid repellent layer of the compound having a perfluoropolyether or perfluoroalkyl chain after being pretreated to have an oxide layer in accordance with the procedure described in each Example.

It should be further understood by those skilled in the art that although the foregoing description has been made on embodiments of the invention, the invention is not limited thereto and various changes and modifications may be made without departing from the spirit of the invention and the scope of the appended claims.

ADVANTAGE OF THE INVENTION

The present invention can provide a highly wear-resistant and mist-proof lens coated with a liquid repellent layer of a compound having a perfluoropolyether or perfluoroalkyl chain without deteriorating its surface anti-reflective capacity measured by light transmittance. It can also provide a highly wear resistant and mist-proof liquid repellent layer of a compound having a perfluoropolyether or perfluoroalkyl chain for a component having no oxide layer on the surface.

The invention claimed is:

1. An optical lens comprising: a glass or transparent resin as a base material; and an anti-reflective membrane on a surface of the base material, wherein magnesium fluoride is used for an outermost layer of the anti-reflective membrane, wherein a magnesium oxide layer and liquid repellent layer made of a compound having a perfluoropolyether or perfluoroalkyl chain are formed on a surface of the magnesium fluoride, and the liquid repellent layer is disposed on the magnesium oxide layer.

2. The optical lens according to claim 1, wherein the liquid repellent layer is made of a compound having a perfluoropolyether chain whose average molecular weight is 2000 or more.

3. The optical lens according to claim 1, wherein the liquid repellent layer is made of a compound having a linear perfluoropolyether chain whose average molecular weight is 2000 or more.

4. The optical lens according to claim 3,
wherein the liquid repellent layer is made of a compound having the following structure:

$$\{F(CF_2CF_2CF_2O)_n\}-X-Si(OR)_3, \text{ or}$$

$$\{F(CF_2CF_2CF_2O)_n\}_2-X-Si(OR)_3$$

wherein, X is a site at which the perfluoropolyether chain is cross-linked to the anti-reflective membrane and linked with an alkoxysilane residue, and R is an alkyl group.

5. A projection type display apparatus equipped with a light source, an optical integrator having a plurality of optical lenses, a display device, a projection optical system, a screen and a reflector, wherein a beam of light from the light source being reflected by the reflector is divided into a plurality of beams of light by the optical integrator to be directed towards the display device and the beams of light modulated by the display device are projected by the projection optical system onto the screen, wherein the optical lens is made of a glass or a transparent resin as a base material, and has an anti-reflective membrane on a surface thereof, the anti-reflective membrane comprises magnesium fluoride for an outermost layer and a magnesium oxide layer and a liquid repellent layer are formed on a surface of the magnesium fluoride, and the liquid repellent layer is made of a compound having a perfluoropolyether or perfluoroalkyl structure, and the liquid repellent layer is disposed on the magnesium oxide layer.

6. The projection type display apparatus according to claim 5, wherein the liquid repellent layer is made of a compound having a perfluoropolyether chain whose average molecular weight is 2000 or more.

7. The projection type display apparatus according to claim 1, wherein the liquid repellent layer is made of a compound having a linear perfluoropolyether chain whose average molecular weight is 2000 or more.

8. The projection type display apparatus according to claim 7, wherein the liquid repellent layer is made of a compound having the following structure:

$$\{F(CF_2CF_2CF_2O)_n\}-X-Si(OR)_3, \text{ or}$$

$$\{F(CF_2CF_2CF_2O)_n\}_2X-Si(OR)_3$$

wherein, X is a site at which the perfluoropolyether chain is cross-linked to the anti-reflective membrane and linked with an alkoxysilane residue, and R is an alkyl group.

* * * * *